(12) United States Patent
Deb et al.

(10) Patent No.: US 8,509,129 B2
(45) Date of Patent: Aug. 13, 2013

(54) SYSTEM AND METHOD FOR ADJUSTING MEDIA ACCESS CONTROL PARAMETERS IN A WIRELESS NETWORK

(75) Inventors: Budhaditya Deb, Nisakayuna, NY (US); Michael James Hartman, Clifton Park, NY (US); David Michael Davenport, Niskayuna, NY (US); Matthew George Grubis, New Berlin, WI (US)

(73) Assignee: General Electric Company, Niskayuna, NY (US)

( * ) Notice: Subject to any disclaimer, the term of this patent is extended or adjusted under 35 U.S.C. 154(b) by 1462 days.

(21) Appl. No.: 12/133,140

(22) Filed: Jun. 4, 2008

(65) Prior Publication Data

US 2009/0303908 A1     Dec. 10, 2009

(51) Int. Cl.
*H04B 7/00*     (2006.01)
(52) U.S. Cl.
USPC .......................... 370/310; 370/235; 370/338
(58) Field of Classification Search
USPC ........................................................ 370/448
See application file for complete search history.

(56) References Cited

U.S. PATENT DOCUMENTS

| 6,965,924 | B1 | 11/2005 | Gerthe |
| 2002/0080886 | A1 | 6/2002 | Ptasinski et al. |
| 2003/0093526 | A1 | 5/2003 | Nandagopalan et al. |
| 2004/0170150 | A1 | 9/2004 | Guo et al. |
| 2005/0122902 | A1* | 6/2005 | Guo et al. ..................... 370/229 |
| 2006/0014492 | A1 | 1/2006 | Del Prado Pavon et al. |
| 2006/0039395 | A1 | 2/2006 | Perez-Costa et al. |
| 2006/0164997 | A1* | 7/2006 | Graepel et al. ................ 370/241 |
| 2006/0215547 | A1 | 9/2006 | Koppol |
| 2006/0291402 | A1 | 12/2006 | Yun et al. |
| 2007/0206547 | A1 | 9/2007 | Gong et al. |
| 2007/0206552 | A1 | 9/2007 | Yaqub et al. |
| 2007/0242621 | A1* | 10/2007 | Nandagopalan et al. ..... 370/254 |
| 2008/0008188 | A1 | 1/2008 | Buga et al. |

(Continued)

FOREIGN PATENT DOCUMENTS

| CN | 101217548 A | 1/2008 |
| EP | 1737165 A1 | 12/2006 |
| WO | 2006050140 A2 | 5/2006 |

OTHER PUBLICATIONS

Zhang et al; "Optimization Method of S-MAC Protocol Parameter Setting in the Wireless Transducer"; CN 101217548 A 20090709; filed Jan. 17, 2008; 1 page; Abstract.

(Continued)

*Primary Examiner* — Ian N Moore
*Assistant Examiner* — Brian T Le
(74) *Attorney, Agent, or Firm* — Scott J. Asmus

(57) ABSTRACT

A system for setting WLAN node operating parameters includes at least one access point (AP) radio and a plurality of nodes in wireless communication with the AP radio according to media access control (MAC) parameters. Each of the plurality of nodes has a quality of service (QoS) threshold for wireless communication with the AP radio that is a function of the MAC parameters and includes a controller configured to provide individualized control of the MAC parameters. The controller is programmed to measure current settings for at least a portion of the MAC parameters for the node, input the current settings for those MAC parameters of the node into a WLAN system model to generate a system model output, and adapt a setting of at least one of the MAC parameters for the node to meet the QoS threshold for the node based on the system model output.

21 Claims, 5 Drawing Sheets

(56) References Cited

U.S. PATENT DOCUMENTS

| | | | |
|---|---|---|---|
| 2008/0056297 A1 | 3/2008 | Gaur et al. | |
| 2008/0160980 A1* | 7/2008 | Harris et al. | 455/418 |
| 2008/0186945 A1* | 8/2008 | Ahn | 370/349 |
| 2010/0329119 A1* | 12/2010 | Zorba Barah et al. | 370/235 |

OTHER PUBLICATIONS

Search Report, United Kingdom Intellectual Property Office, Jul. 31, 2009, 3 pages.

El Housseini et al., Adaptive contention-window MAC algorithms for QoS-enabled wireless LANs, 2005 International Conference on Wireless Networks, Communications, and Mobile Computing, pp. 368-374.

Li et al., Achieving optimal performance by using the IEEE 802.11 MAC protocol with service differentiation enhancements, 2007 IEEE Transactions on Vehicular Technology, 56(32), pp. 1374-1387.

Lin et al., Modified EDCF to improve the performance of IEEE 802.11e WLAN, 2007 Computer Communications, 30(4), pp. 841-848.

* cited by examiner

SYSTEM AND METHOD FOR ADJUSTING MEDIA ACCESS CONTROL PARAMETERS IN A WIRELESS NETWORK

BACKGROUND OF THE INVENTION

The present invention relates generally to communications in a wireless local area network (WLAN) and, more particularly, to the dynamic adjustment of wireless communications protocol for meeting quality of service (QoS).

The Institute of Electronic and Electrical Engineers (IEEE) 802.11 standard for wireless LANs is becoming a popular mechanism for setting up networks in many industrial, office, home and medical environments. The WLAN is being preferred over the wired LANs due to ease of deployment and setting up of infrastructure as well as having mobility with network devices while having connectivity. The IEEE 802.11 protocol includes a media access control (MAC) layer for controlling wireless communication. The basic 802.11 MAC layer uses a Distributed Coordination Function (DCF) to share the wireless medium between multiple nodes in the WLAN. DCF relies on Carrier sense multiple access with collision avoidance (CSMA/CA) and optional 802.11 RTS/CTS (Request to Send/Clear to Send) to share the medium between nodes. The main limitation of the legacy 802.11 is that it cannot support Quality of Service differentiation among different types of traffic. That is, every type of traffic is treated with equal fairness in the network. This attribute is adequate for best effort traffic, but for delay and throughput sensitive traffic such as real time video, a prioritization framework is needed with high priority traffic getting a larger share of the shared wireless medium. (Note: Bandwidth is lowered primarily due to backoffs and not collisions. Collisions are prevented partially by CSMA and RTS/CTS).

To provide such QoS differentiation, the original 802.11 MAC defines another coordination function called the Point Coordination Function (PCF). When nodes are connected to the network through an Access Point (AP), APs send "beacon" frames at regular intervals (usually every 0.1 second). Between these beacon frames, PCF defines two periods: the Contention Free Period (CFP) and the Contention Period (CP). In CP, the DCF is simply used. In CFP, the AP sends Contention Free-Poll (CF-Poll) packets to each station, one at a time, to give them the right to send a packet. The AP is the coordinator. This allows for a better management of the QoS. However, as stated above, the PCF has limited support, does not define classes of traffic, and needs central coordination, which is not suitable in highly dynamic environments.

Since the legacy 802.11 does not have adequate support for QoS, a new standard called 802.11e has emerged which has prioritized traffic delivery for differentiating between traffic at different levels of criticality. The new standard achieves QoS by having separate MAC parameters for different service classes. That is, the 802.11e enhances the DCF and the PCF, through a new coordination function: the Hybrid Coordination Function (HCF). Within the HCF, there are two methods of channel access, similar to those defined in the legacy 802.11 MAC: HCF Controlled Channel Access (HCCA) and Enhanced Distributed Channel Access (EDCA). Both EDCA and HCCA define Traffic Classes (TC). For example, emails could be assigned to a low priority class, and Voice over Wireless LAN (VOWLAN) could be assigned to a high priority class.

With EDCA, 802.11e achieves Quality of Service differentiation by having different MAC parameters (TXOP, CW, AIFS, RL) for different traffic classes. A transmit opportunity (TXOP) is a bounded time interval during which a station can send as many frames as possible (as long as the duration of the transmissions does not extend beyond the maximum duration of the TXOP). If a frame is too large to be transmitted in a single TXOP, it is fragmented into smaller frames. Additionally, EDCA includes access categories and multiple independent back off entities for accessing each channel, including: a contention window size (CWmin[AC]) for each class, an Arbitration Interframe Space (AIFS[AC]), and a Frame Retransmission Limit (RL[AC]). Using different MAC parameters for low and high priority traffic class, the higher priority traffic is provided more opportunities to transmit than low priority traffic.

The HCCA (HCF (Hybrid Coordinator Function) Controlled Channel Access) is similar to PCF in legacy 802.11. However, in contrast to PCF (where the interval between two beacon frames is divided into two periods of CFP and CP), HCCA allows for CFPs being initiated at almost any time during a CP (called a Controlled Access Phase (CAP) in 802.11e), allowing more control for different traffic classes. A CAP is initiated by the Hybrid coordinator, (which is in fact the Access Point (AP)), whenever it wants to send a frame to a station, or receive a frame from a station, in a contention free manner. During a CAP, the Hybrid Coordinator (HC)—which is also the AP—controls the access to the medium. HCCA also defines new Traffic Streams (TS) in addition to Traffic Class (TC), which makes it possible to control QoS for traffic sessions at each node and affect individual packet queues. This means that the HC is not limited to per-station queuing and can provide a kind of per-session service. The HC can coordinate these streams or sessions in any fashion it chooses by giving information about the lengths of their queues for each Traffic Class (TC). The HC can use this info to give priority to one node over another, or better adjust its scheduling mechanism. Additionally, nodes are given a TXOP: they may send multiple packets in a row, for a given time period selected by the HC. With the HCCA, QoS-enabled nodes also have the ability to request specific transmission parameters (data rate, jitter, etc.), which allow applications like VoIP and video streaming to work more effectively on a Wi-Fi network.

Even though 802.11e can differentiate between the service classes, under standard operating conditions the 802.11e parameters are static in nature, meaning that it is not optimal under all network conditions. When network conditions in the WLAN change, the 802.11e parameters do not adapt to those changing conditions. Moreover, the default parameters for the different traffic classes are meant to specifically support Best Effort, Video and Voice traffic only. This makes the 802.11e default parameters unsuitable for some applications. For example, due to the static nature of its parameters, the 802.11e default parameters are unsuitable with respect to meeting the QoS requirements of medical devices used in patient monitoring in a hospital environment, where threshold levels of signal throughput and signal delay must be met.

Therefore, it would be desirable to design an apparatus and method that allows for the dynamic adjustment of MAC parameters for meeting a QoS requirement. It would also be desirable for the system and method to allow for automatically setting the MAC parameters in a distributed manner, using only local knowledge obtained at the individual node and for the MAC parameters to be based on an individual node's QoS requirements.

BRIEF DESCRIPTION OF THE INVENTION

The present invention provides a system and method for setting a plurality of operating parameters for a node in a WLAN such that a QoS requirement is met. The operating parameters for meeting the QoS requirements are determined by way of local measurements acquired by the node that are plugged-into a local, analytical model of the WLAN.

In accordance with one aspect of the invention, a wireless local area network (WLAN) includes at least one access point radio and a plurality of nodes in wireless communication with the at least one access point radio according to media access control (MAC) parameters, each of the plurality of nodes having a quality of service (QoS) threshold for wireless communication with the at least one access point radio that is a function of the MAC parameters. Each of the plurality of nodes comprises a controller configured to provide individualized control of the MAC parameters corresponding to the node. The controller is programmed to measure current settings for at least a portion of the MAC parameters for the node, input the current settings for the at least a portion of the MAC parameters of the node into a WLAN system model to generate a system model output, and adapt a setting of at least one of the MAC parameters for the node to meet the QoS threshold for the node based on the system model output.

In accordance with another aspect of the invention, a method for selecting a plurality of operating parameters for a node in a wireless local area network (WLAN) includes the steps of deriving a local analytical model of the WLAN based on media access control (MAC) parameters and wireless signal traffic characteristics, acquiring local measurements of a portion of the MAC parameters at the node, and determining an achieved quality of service (QoS) for the node by applying the acquired local measurements of the portion of the MAC parameters to the local analytical model. The method also includes the steps of performing an adaptive optimization of the local analytical model and modifying at least one of the MAC parameters of the node based on the adaptive optimization to meet a QoS threshold for the node.

In accordance with yet another aspect of the invention, a controller for a wireless local area network (WLAN) node is programmed to set a quality of service (QoS) requirement for a wireless signal transmission from the WLAN node, the wireless signal transmission being governed by a plurality of media access control (MAC) parameters. The controller is also programmed to generate a model of a WLAN that is based on the plurality of MAC parameters and on signal traffic characteristics of the wireless signal transmission, receive measurements of MAC layer acknowledgements and signal retransmissions from the WLAN node, and insert the received MAC layer acknowledgements and signal retransmissions from the WLAN node into the generated model of the WLAN. The controller is further programmed to perform an adaptive optimization of the generated model upon insertion of the received MAC layer acknowledgements and signal retransmissions to determine a desired value for at least one of the plurality of MAC parameters that satisfies the QoS requirement for the wireless signal transmission by the WLAN node and modify the at least one of the plurality of MAC parameters based on the adaptive optimization to the desired value to satisfy the QoS requirement for the wireless signal transmission by the WLAN node.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Figure 1:
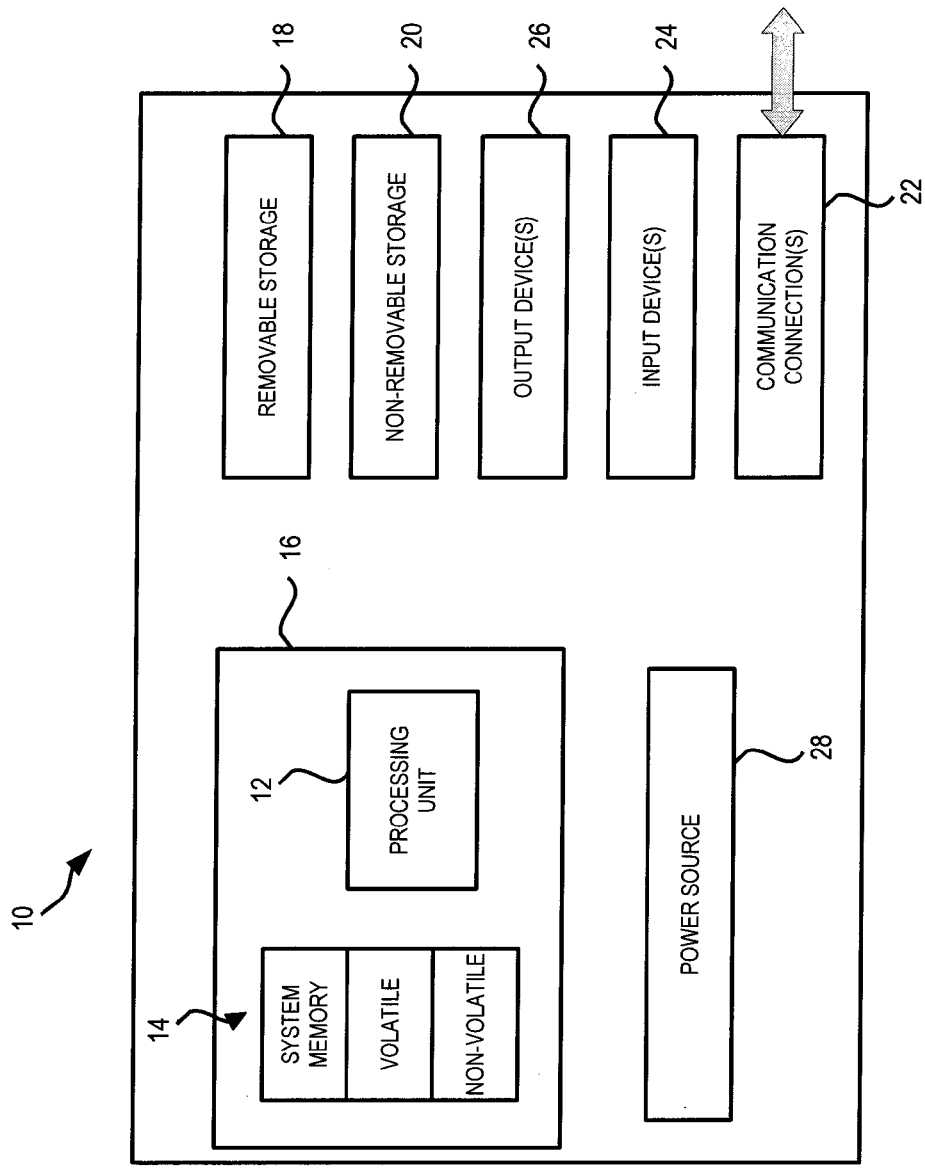
FIG. 1 is a block schematic diagram of a wireless local area network (WLAN) node according to the invention.

Referring to FIG. 1, an example of a suitable computing device 10 on which the invention may be implemented is shown. The computing device 10 is only one example of a suitable computing environment and is not intended to suggest any limitation as to the scope of use or functionality of the invention. Neither should the computing device 10 be interpreted as having any dependency or requirement relating to any one or combination of components illustrated in the exemplary operating device 10.

As illustrated in FIG. 1, computing device 10 comprises a user station or node in the form of a wireless mobile device. As will be explained in greater detail below, node 10 is set up for access to a wireless local area network (WLAN). In its most basic configuration, the node 10 includes at least a processing unit 12 and a memory 14. Depending on the exact configuration and type of computing device, the memory 14 may be volatile (such as RAM), non-volatile (such as ROM, flash memory, etc.) or some combination of the two. The processing unit 12 and memory 14 are included in, and form part of, a controller 16.

The node 10 may also have additional features/functionality. For example, node 10 may also include additional storage (removable and/or non-removable) including, but not limited to, magnetic or optical disks or tapes. Such additional storage is illustrated in FIG. 1 by a removable storage 18 and a non-removable storage 20. Computer storage media includes volatile and nonvolatile, removable and non-removable media implemented in any method or technology for storage of information such as computer readable instructions, data structures, program modules or other data. Node 10 may also contain one or more communications connections 22 that allow the node to communicate with other devices. The communications connection 22 provides for communication with a WLAN via, for example, acoustic, RF, infrared and other wireless media. As discussed above, the term computer readable media as used herein includes both storage media and communication media.

Node 10 may also have one or more input devices 24 such as keyboard, mouse, pen, voice input device, touch-input device, etc. Input devices 24 may also include analog or digital signal inputs. One or more output devices 26 such as a display, speakers, printer, etc. may also be included. All these devices are well known in the art and need not be discussed at greater length here. Node 10 is also provided with a portable power source 28, such as a battery pack or the like. The power source 28 provides power for computations and wireless data transmissions by the node 10.

Figure 2:
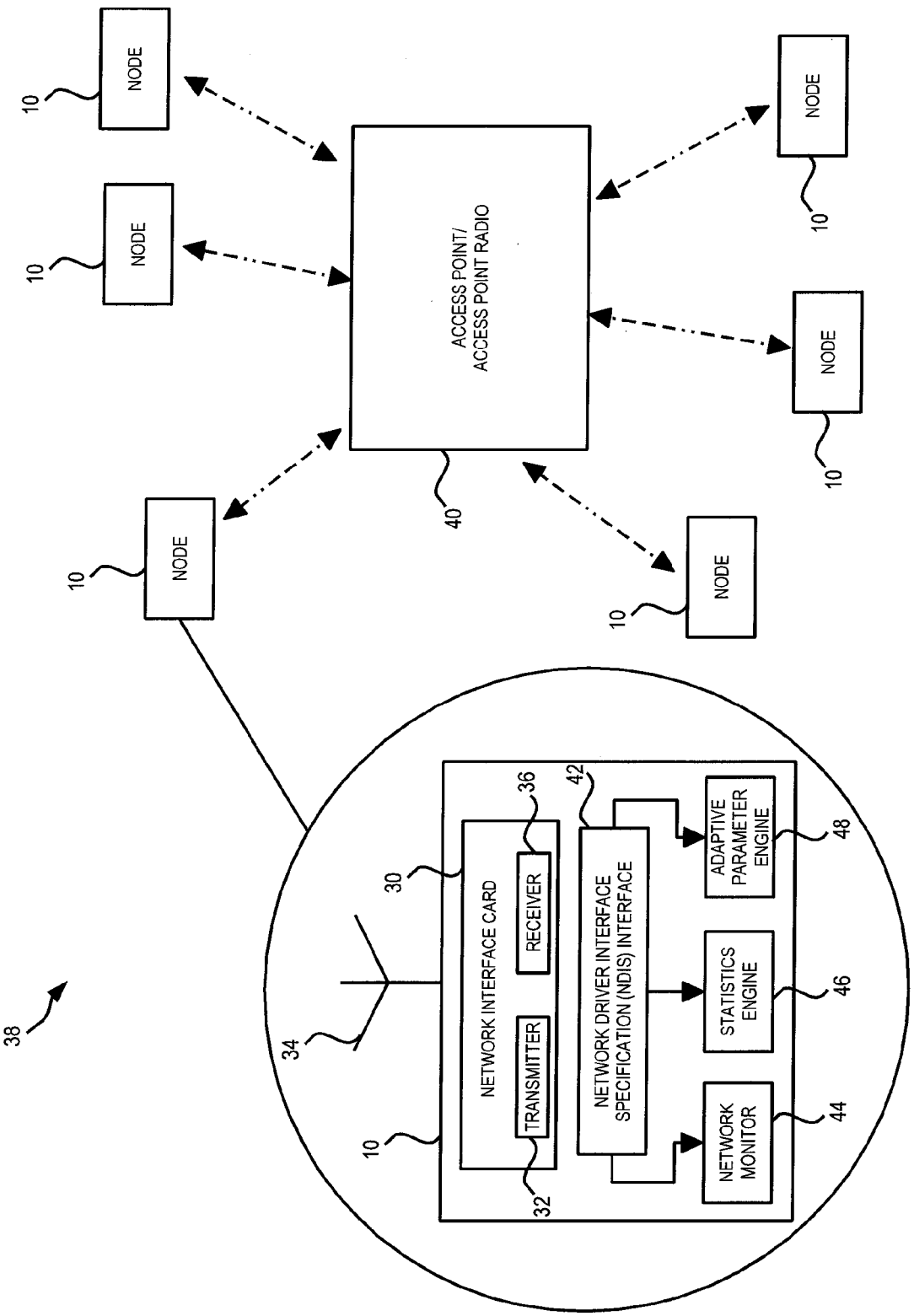
FIG. 2 is a block schematic diagram of a node connected to a WLAN according to an embodiment of the invention.

Referring now to FIG. 2, node 10 further includes a network interface card (NIC) 30 for wirelessly communicating with different types of wireless networks. The NIC 30 includes a transmitter 32, which is coupled to an antenna 34 for transmitting data wirelessly over a suitable frequency channel. A receiver 36 is also coupled to the antenna 34 for receiving communication packets wirelessly transmitted from the networks. The network interface module 30 and the antenna 34 are part of the communication connections 22 in FIG. 1. In one embodiment, the network interface card 30 employs wireless configuration service over IEEE 802.11e wireless connections to ease network configuration, including infrastructure networks and ad hoc networks. An exemplary network interface card is a PCMCIA wireless card.

Through the wireless network interface card, node 10 may communicate with different types of wireless networks. For instance, in the illustrated environment of FIG. 2, node 10 comprises part of a WLAN 38 (along with additional nodes 10) and is connected wirelessly to the WLAN 38 through one or more access point radios (i.e., access points) 40 therein. The node 10 may be in a state of searching for devices that belong to the network by periodically scanning actively by sending probe requests and scanning for probe response signals transmitted by the access point. Alternatively, node 10 may search passively by scanning for beacons transmitted by access point 40.

Referring still to FIG. 2, controller 16 includes a network driver interface specification (NDIS) interface 42 that controls the operation of the network interface card 30. According to embodiments of the present invention, an exemplary NDIS interface 42 is according to IEEE 802.11e protocol and includes statistical data concerning the network traffic sent and received via transmitter 32 and receiver 36. According to an embodiment, controller 16 also includes a network monitor 44 that is coupled to NDIS interface 42 to receive one or more statistical parameters. Controller 16 further includes a statistics engine 46 that, as explained in further detail below, receives the statistical parameters and performs operations on the parameters to determine probabilities, such as collision probabilities. The probabilities are transmitted to an adaptive parameter engine 48 included in controller 16 for determining new parameters for the MAC layer as maintained by the NDIS interface 42 to provide QoS differentiation.

Figure 3:
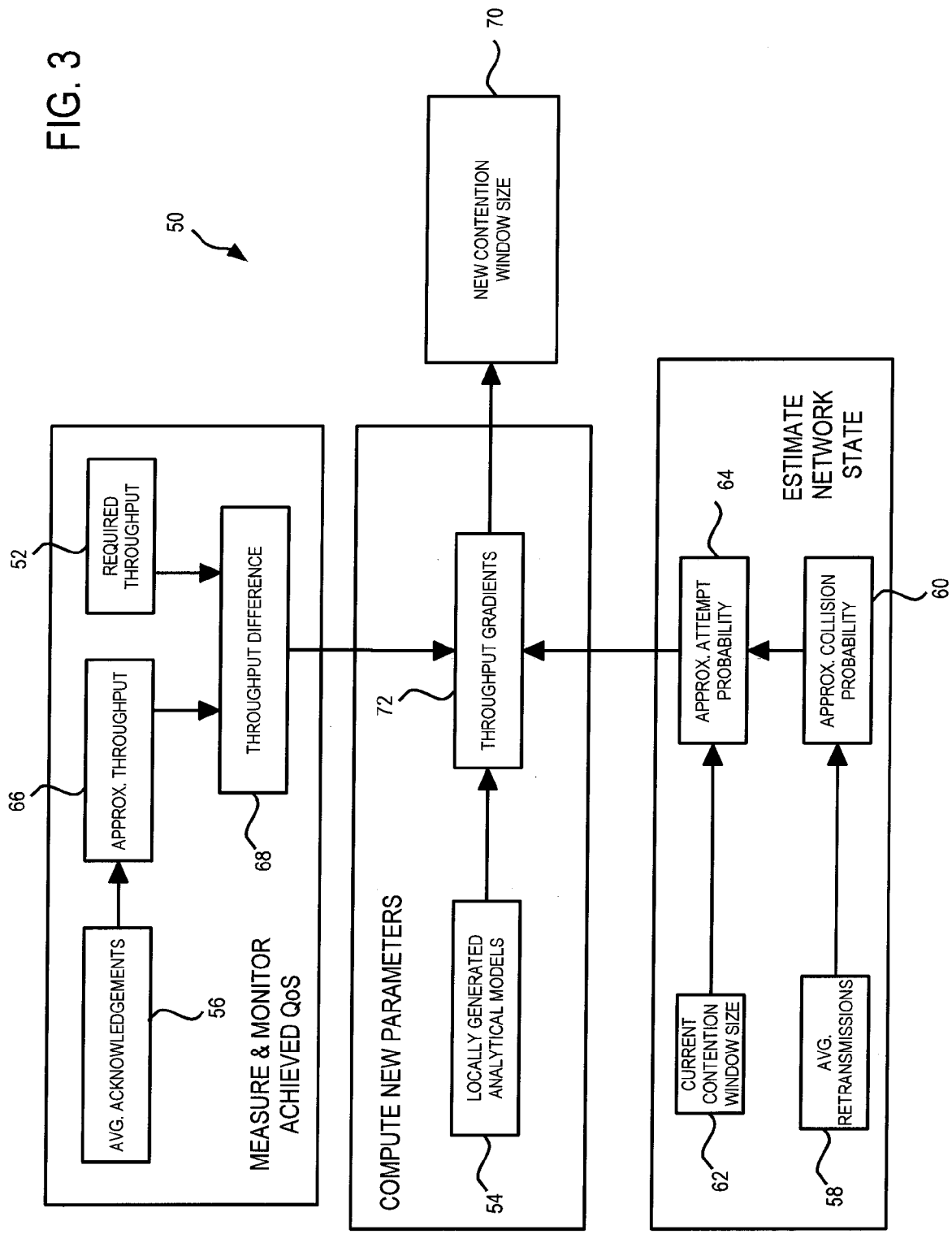
FIG. 3 is a block diagram illustrating a technique according to an embodiment of the invention.

Referring now to FIG. 3 in combination with FIG. 2, a block diagram illustrates a computer implemented process/technique 50 directed to providing QoS differentiation in WLANs. In an exemplary embodiment, the technique 50 is directed to an adaptation of at least one parameter of the MAC layer of an 802.11e implementation of a WLAN. Specifically, the technique 50 shown in FIG. 3 provides updates to the contention window (CW) parameter that alters a size of the CW according to a required QoS for each node/device. An adaptive method for determining a CW is desirable because the size limits on the CW affects WLAN system efficiency as a function of the number of transmissions attempted over a channel. If a channel is crowded, meaning that the channel is busy with devices attempting transmissions, a small fixed CW value results in a too small period of opportunity for all the devices to transmit. A small fixed CW results in collisions that waste spectrum efficiency. An increase in the CW decreases the collision probability. Also, the time cost of waiting is much smaller than the cost of collision plus backoff period. However, when a WLAN system contains only a few devices, the collision probability is quite low. Accordingly, a CW value that is too large requires a device to wait unnecessarily to transmit a frame. A decrease in the CW expedites the data transmission and increases system throughput. Therefore, depending on the number of devices at any given time and the potential for collisions, the proper CW for efficient transmission can change over time. An adaptive CW calculation is, therefore, preferred.

While described and shown with respect to the adaptation of a CW size in a MAC layer, it is also envisioned that other or additional MAC parameters could be modified rather than the CW. Additionally, it is further envisioned that the technique 50 could be applied to other wireless communication protocols beyond 802.11e, such as updated 802.11 protocols (e.g., 802.11n).

According to an embodiment of the invention, an adaptive CW calculation on a per-node/wireless device level is implemented as a distributed type of control for a WLAN, thus ensuring QoS for each node in the WLAN, the QoS defining a throughput level and time delay in packet transmission that are desired for wireless transmission for that node. The controller 16 in each node 10 is configured to perform a distributed and adaptive algorithm for adapting CW sizes that works under the framework of the 802.11e standard for WLAN and uses local computations to dynamically select 802.11e operating parameters to satisfy the QoS requirements (i.e., throughput and delay), as set forth in detail below. In the distributed control scheme, the controller 16 in each of nodes 10 in WLAN 38 separately apply technique 50 based on its individual view of the WLAN operating conditions. That is, based on local measurements acquired at each node, and based on each node's QoS requirements, each node determines the appropriate adaptation of its CW size that allows it to satisfy its own QoS requirements.

Referring to FIG. 3, the technique 50 at an individual node 10 is based on an initial setting/determination of the QoS requirements for that node 52 (i.e., throughput and delay). The QoS requirement for the node is a function of the node use, and a certain QoS threshold is set that allows the node to function according to its associated use. For example, in a hospital setting, a DASH device (used for collecting patient monitoring data, such as ECG, heart rate and blood pressure) may have a different QoS requirement than a CITRIX device (used for viewing patient data remotely) according to patient monitoring requirements.

Also in technique 50, a local analytical model of the WLAN system at the node 10 is designed 54 that captures the 802.11e MAC layer behavior. The local analytical model is based on the MAC layer parameters (contention window, AIFS, retransmissions) and traffic characteristics (packet generation rate and sizes). These parameters appear as a system of N equations (for each individual node in the WLAN, each node having its own parameter values), which can be solved to determine the state of the WLAN (collision probability, contention window backoffs, retransmissions, achieved throughput, delay) at balanced conditions.

The optimal values for each parameter are determined based on the QoS requirements for each node. However, as set forth above, a size of the contention value is controlled to achieve the QoS requirements in the invention, while keeping all the other parameters at the default values assigned to different classes in 802.11e. According to the generated analytical model 54, a system of equations is formed from the MAC parameters and traffic characteristics that define the state of the WLAN. In one equation, the number of expected backoffs in the system is given by:

$$E(backoffs) = \\ b_i + b_i 2Pc_i + \ldots + b_i 2^r Pc_i^r + b_i 2^r Pc_i^{r+1} + \ldots + b_i 2^r Pc_i^{K_i}$$

$$E(backoffs) = \frac{b_i(1 - (2Pc_i)^{r_i+1})}{(1 - 2Pc_i)} + \frac{2^r b_i(1 - Pc_i^{K_i - r_i})}{(1 - Pc_i)},$$ [Eqn. 1]

wherein $K_i$=maximum number of attempts to send a packet, $b_i$=Minimum CW for the $i^{th}$ node, $2^r b_i$=Maximum CW, and r=# of times CWs double in size up to a maximum value. Additionally, $Pa_i$=the Attempt Probability, which is the probability that a node will transmit data in a generic slot, and $Pc_i$=the probability that transmission is deferred due to collisions. To transmit a packet, the node 10 selects a slot number at random from its current CW size. If there is a collision or if the channel is busy, the CW size is doubled for the next attempt. For the expected number of backoffs, we see that for each collision, the CW size doubles until it reaches the maximum CW value. After that, the CW size remains constant while retransmissions or attempts continue until the maximum retransmission limit ($K_i$) is reached.

According to the analytical model, the probability of retransmission for a packet is simply a geometric distribution of the collision probability, $Pc_i$. Thus the expected number of transmissions is given by:

$$E(\text{transmissions}) = 1 + Pc_i + \ldots + Pc_i^{K_i} = \frac{(1 - Pc_i^{K_i+1})}{(1 - Pc_i)}. \quad [\text{Eqn. 2}]$$

The attempt probability, $Pa_i$, to transmit in a generic slot is the ratio of the expected retransmissions and back off slots, and is given by:

$$Pa_i(b_i, Pc_i) = \frac{E(\text{retransmissions})}{E(\text{backoffs})}. \quad [\text{Eqn. 3}]$$

Next, the collision probability for a node is the rate with which a packet transmission in a generic slot collides with another packet transmission from some other node (i.e., there is at least one other node attempting to transmit a packet simultaneously). Thus, the Collision Probability is:

$$Pc_i = Pa_i\left(1 - \prod_{j=1, j \neq i}^{N} (1 - Pa_j)\right). \quad [\text{Eqn. 4}]$$

From the attempt and collision probabilities, it is possible to derive throughput equations. When a new packet is generated, the time between packet generation and successful transmission in the 802.11e protocol is given by:

$$\text{Delay}(Pc_i, b_i) = AIFSN_i + \left(\frac{L_i}{R_i} + B_i\right) + T_{Slot}E(\text{backoffs}), \quad [\text{Eqn. 5}]$$

wherein $L_i$=Average packet length, $B_i$=Constant overhead in slots for packet transmissions, $T_{slot}$=Constant Slot Time, $R_i$=Data Rate, and AIFSN=the AIFS number or the number of arbitration slot times the node waits before transmission attempt.

Thus, the actual achieved throughput can be computed by:

$$T_{analytical}(Pc_i, b_i) = C \frac{L(1 - Pc_i)Pa_i}{\text{Delay}(Pc_i, b_i)}, \quad [\text{Eqn. 6}]$$

where C is a constant that would be computed after some initial measurements to account for any inaccuracy in the analytical model assumed for the system. That is, the TXOP limit is not considered in the throughput calculations, and thus, there will be a difference in the analytical and actual throughput, which the constant C accounts for.

Eqns. 1-6, as set forth above, thus defines an analytical model of the WLAN system. It is envisioned that the analytical model can be generated as set forth above and implemented for setting a plurality of operating parameters for a node in a WLAN to meet a QoS requirement. It is further envisioned that an analytical model of the WLAN system can be generated and then stored for use at a later time with respect to setting a plurality of operating parameters for a node in a WLAN or used to generate a look-up table for use at a later time. That is, in determining/setting operating parameters to meet a QoS requirement, it is envisioned that a node could access a stored analytical mode of the WLAN or a look-up table representing the analytical model (rather than generate a new system model) in order to speed-up calculations.

To allow for the computation of the analytical throughput (associated with a QoS requirement), values of at least a portion of the MAC layer parameters are obtained and plugged into the equations. According to the invention, MAC parameter values are estimated for each of the nodes using only locally measurable values. That is, for each node, locally acquired data from the node is used to determine optimal parameters in the analytical model that meets the analytical throughput. In an exemplary embodiment, the MAC layer acknowledgments 56 and signal retransmissions 58 (i.e., packet retransmission rate) are measured locally at the node.

For approximating the collision probability 60 (see Eqn. 4), it is assumed that packets are lost only due to collisions. Thus, the collision rate can be estimated by considering the packet retransmission rate 58 in the node. Using the measured average number of retransmissions, R, for a node, and applying the measurement to the analytical model 58, the collision probability can be estimated 60 by solving the following equation:

$$1 + R = \sum_{i=0}^{K} Pc^i = \frac{1 - Pc^{K+1}}{1 + Pc}. \quad [\text{Eqn. 7}]$$

Since the attempt probability is based on the CW size 62 (i.e., the known, existing CW size) and is directly linked to collisions, the known CW size and the value of the collision probability estimated in Eqn. 7 are then used to estimate the attempt probability 62.

For approximating the achieved throughput 66, the proportionality constant, C, in the throughput equation (Eqn. 6) is first approximated. C is approximated based on the achieved throughput (estimated using the measured MAC layer acknowledgements 56) after the network is assumed to have stabilized. The constant C is then calculated as:

$$C = \frac{T_{measured}}{T_{analytical}(Pc_i, b_i)}. \quad [\text{Eqn. 8}]$$

A throughput difference 68 can thus be obtained between the required throughput 52 (needed to meet the QoS threshold/requirement) and the approximated achieved throughput 66.

The acquisition of the local measurements and approximation of MAC parameters based on these local measurements and the analytical model of the WLAN (as set forth in Eqns. 1 to 8) results in a system of equations that set forth the relationship between CW values, collision probability, and throughput, and can be solved to determine CW sizes that meet QoS requirements. The system of non-linear equations for each node 10 is:

$$F^i(Pc_i, Pa_i, b_i) \equiv T_{REQD} - T_{analytical}(Pc_i, Pa_i, b_i) = 0 \quad \text{[Eqn. 9]}$$

$$G^i \equiv Pc_i - Pa_i\left(1 - \prod_{j=1, j \neq i}^{N}(1 - Pa_j)\right) = 0$$

$$H^i(Pc_i, Pa_i, b_i) \equiv Pa_i - Pa_{ii}(b_i, Pc_i) = 0.$$

To find the CW values for each node that would satisfy the throughput requirements, the system of equations is solved. For N nodes, solving the 3×N equations will give the values of the three unknowns for each node. As the non-linear equations do not have closed form solutions, an adaptive algorithm in the form of a gradient-descent based optimization 72 is used to compute the next best estimate of the unknown values and repeat the step until the values converge to an optimized value. Global optimization requires simultaneous solution (analytical or numerical) of the 3N equations for which parameters for every node are required. For distributed solution, each node only computes its partial solutions based on partial gradients of its specific system of equations set forth in Eqn. 9, as is described in detail below.

From Eqn. 9, it is seen that the gradient-descent based adaptive algorithm attempts to find the next best estimate of the CW values which will satisfy the constraints of the throughput equations. That is, the next best estimate of the CW values that satisfy the throughput requirement for QoS is determined. As the adaptive algorithm is distributed, the next CWs are computed using only local measurements and solving the throughput equations in a distributed manner. The distributed manner of this adaptive algorithm means that each node 10 of the WLAN 38 computes and solves the equations. Thus, in the distributed algorithm, the CW values satisfying the throughput requirements are found by distributed numerical solution of these sets of equations (Eqn. 9). At each time period, a single step of the gradient descent is performed to find the next best estimate of the CW value. This value will be used for the next time period after which the computed statistics will be input to the next step in the gradient descent.

It is recognized that the set of equations in Eqn. 9, for each individual node, cannot be solved without global knowledge. Thus, the parameters of other nodes are eliminated so that local computation of CW values is possible. To do so, the system of three equations of Eqn. 9 is reduced. Initially, the value of $Pa_i$ from Eqn. 1 is put into $F^i$ to eliminate $Pc_i$ from the equation. As $F^i$ is a function of only $b_i$ and $Pa_i$, the following holds:

$$F^i(Pa_i, b_i) \equiv T_{RBQD} - T_{analytical}(Pa_i, b_i) = 0 \quad \text{[Eqn. 10].}$$

Additionally, as:

$$\pi_i = \left(1 - \prod_{j=1, j \neq i}^{N}(1 - Pa_j)\right), \quad \text{[Eqn. 11]}$$

the functional G can be rewritten as:

$$G(Pc_i, b_i) = Pc_i - Pa_i\pi_i = 0 \quad \text{[Eqn. 12].}$$

To eliminate $\pi_i$ in Eqn. 12, the equations belonging to the other nodes are considered. That is, it is assumed that only node i changes its CW ($b_i$) while rest of the network remains the same and that when only a single node changes the CW, and the change is small, $\pi_i$ is a quasi-constant (i.e. it changes very slowly compared to the individual probabilities). This can be estimated as follows:

$$\pi_i = \frac{Pc_i}{Pa_i}. \quad \text{[Eqn. 13]}$$

Next, $\pi_i$ is taken to be a quasi-constant (which in reality is a function of the attempt probabilities of other nodes, but changes very slowly compared to the individual probabilities) when the number of nodes are large and only one node changes its CW value by a small amount. This is because it has been shown that for a large number of nodes, the probability to transmit at any arbitrary slot, Pa, is proportional to $1/(b_i)$. That is, Pa converges to a value, which is independent of the attempt probabilities of other nodes. Thus $\pi_i$ can be considered a constant if the CW values of the other nodes remain the same.

The next best estimate of the $b_i$ can then be found using Newton's method of residuals and solving the following linear equations:

$$(Pc_i^t - Pc_i^{t-1})\frac{dF_i^{t-1}(Pc_i, b_i)}{dPc_i} + (b_i^t - b_i^{t-1})\frac{dF_i^{t-1}(Pc_i, b_i)}{db_i} = \quad \text{[Eqn. 14]}$$
$$-F_i(Pc_i^t, b_i^t) = T_{measured} - T_{Reqd},$$

$$Pc_i^t - Pc_i^{t-1}\frac{dG_i^{t-1}(Pc_i, b_i)}{dPc_i} + (b_i^t - b_i^{t-1})\frac{dG_i^{t-1}(Pc_i, b_i)}{db_i} = \quad \text{[Eqn. 15]}$$
$$-G_i(Pc_t^i, b_i^t).$$

Simplifying the above equations, the next best estimate for the CW value is given by:

$$b_i^t = \frac{-G_i^{t-1} + b_i^{t-1}\left(\frac{dG_i^{t-1}}{db_i} - \frac{\frac{dF_i^{t-1}}{db_i}}{\frac{dF_i^{t-1}}{dPc_i}}\right) + \frac{F_i^{t-1}}{\frac{dF_i^{t-1}}{d\gamma_i}}}{\frac{dG^{t-1}}{db_i}\left(1 - \frac{\frac{dF_i^{t-1})}{db_i}}{\frac{dF_i^{t-1}}{dPc_i}}\right)}. \quad \text{[Eqn. 16]}$$

As can be seen, Eqn. 16 computes the partial differentials of the two functionals with respect to the two unknowns. This is essentially Newton-Rhapson's or Gradient Descent step for numerically solving a system of equations. It is noted that for this step, which is conducted at each node, only the information available to the node is used.

To thus find a desired CW size that will achieve the required QoS for the node, the above process steps are repeated until the solution converges. However, as there is no global knowledge of the WLAN system (i.e., data acquired from other nodes), the descent cannot be performed to completion, although a single step can be executed with local knowledge. Thus, after each step, the actual network statistics are measured, which serves as the inputs to the next step in the descent. That is, the unknown elements in the analytical model (i.e. the values from equations belonging to the other nodes) are inferred from the local statistical measurements. Using the actual network throughput appears in the right hand side of Eqn. 14, where instead of using the analytical model to compute the residual on the right hand side, the estimated values from measurements are used (i.e., MAC layer acknowledgments). This provides an actual feedback to the system. The gradients on the left hand side of Eqn. 14 are computed using the analytical model. It is recognized that the convergence of the solution for determining the size of the CW need not be complete. That is, a tolerance of the adaptive algorithm can be set such that, for example, once the achieved throughput (and its corresponding CW size) comes within 10% of the required throughput for the QoS threshold, the gradient descent operation of the adaptive algorithm ceases.

To improve the convergence time of Eqn. 16, the update time period for the CWs is reduced. For example, the update period can be set at a value of 1 Hz. The immediate effect of reducing the update time interval is the high increase in the variance of the measured statistics. To stabilize the CW changes, the change in CW size is limited to half the current size of the CW, i.e. ($b_i^t$ (diff)$\leq \frac{1}{2} 2b_i^{t-1}$). Moreover, to smooth out high variance effects, the measured differences in the statistics used in computing the analytical gradients are limited. The above steps lead to rapid convergence while making the adaptive algorithm completely stable for various network conditions.

Beneficially, the gradient-descent based adaptive algorithm optimizes the total throughput of the WLAN system in high traffic cases. The adaptive algorithm set forth above is used to find the optimal CW values which would maximize the network throughput. To do this, the WLAN network throughput limit ($T_{limit}$) is found by having a single node generating traffic in the network. When there are two or more nodes, the required throughput value for each of the nodes is set as $T_{limit}/n$. This means that the adaptive algorithm will attempt to match the network throughput limit with each node having an equal share in the bandwidth. The analytical gradient scheme thus manages to keep the total throughput of the WLAN system almost flat and very close to the limit. This follows from the fact that, with increasing CW sizes, the collision probability, retransmissions, and packet drops become significantly small. Even with a large number of nodes, the WLAN network behaves similar to a single node scenario (which will have no collisions), and hence near optimal throughput for the system is achieved.

The "scalability" of the system set forth above thus allows for a WLAN having a large number of nodes, as the total throughput remains almost a constant. In the context of adding additional nodes to the WLAN (i.e., admission control), this makes an analysis by a WLAN controller (e.g., access point radio 40, FIG. 2) on whether to allow admission of an additional node 10 much simpler. That is, in admission control, the access point 40 usually looks at the current QoS allocations and finds the residual bandwidth to allow new nodes 10 to enter the system. With the analytical gradient algorithm, since the WLAN system throughput remains constant, the residual bandwidth calculated before and after admitting a node 10 would remain the same, making it a very simple decision for the access point 40 as to whether to admit the node or not. Conversely, with the static parameters of default 802.11e protocol, as the total throughput of the WLAN system goes down with a larger number of nodes, it is difficult to estimate whether admitting a new node would violate the QoS allocations. As the total throughput of the WLAN system would reduce with a new node, the earlier calculation of the residual bandwidth would not be valid.

Figure 4:
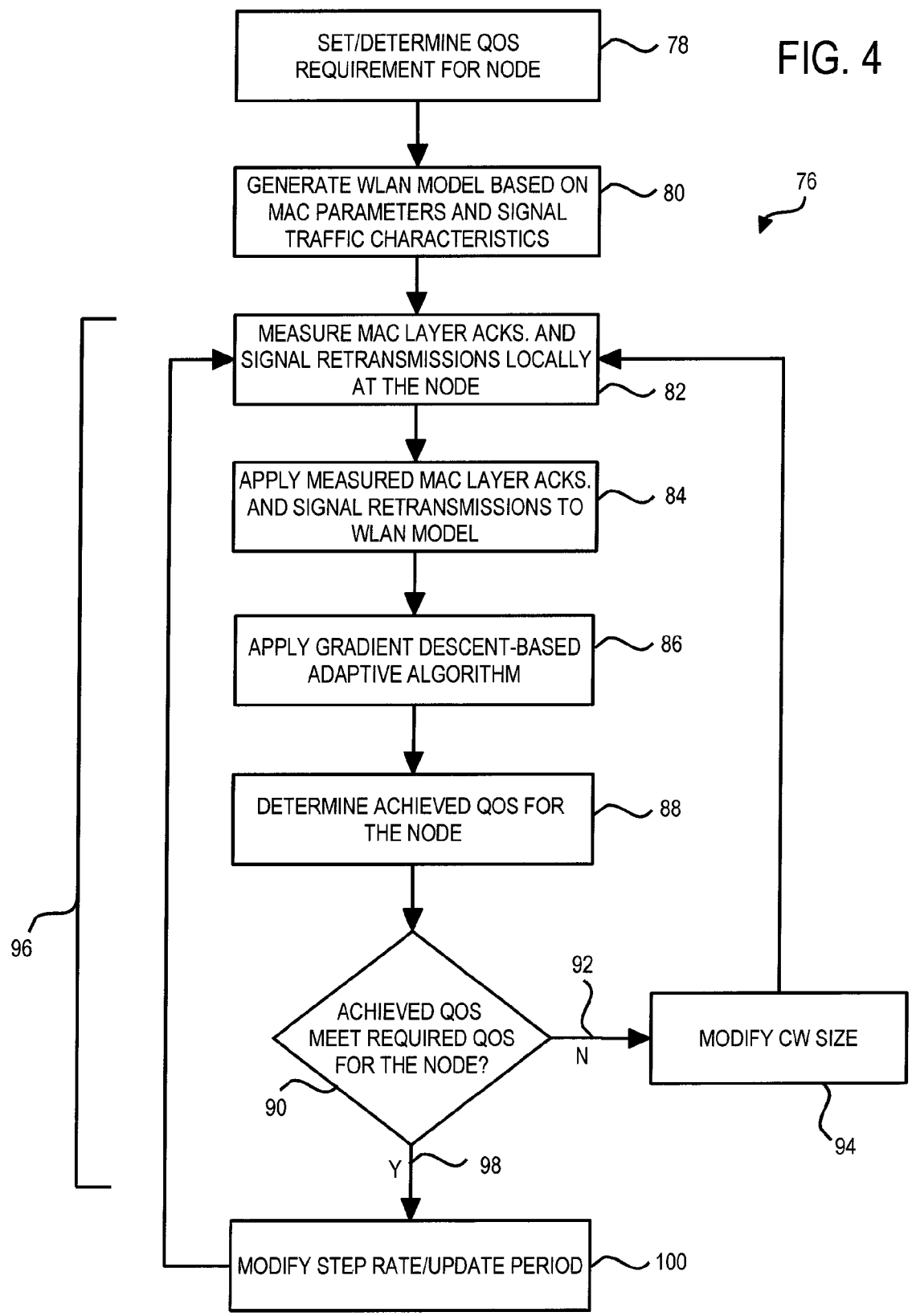
FIG. 4 is a flow chart illustrating a technique according to an embodiment of the invention.

Referring now to FIG. 4, a flow chart of the process/technique 50 of FIG. 3 is provided that illustrates the technique 50 as a series of sequential steps. As shown in FIG. 4, the technique 76 begins with the setting/determination of QoS requirements for a specified node 78 (i.e., throughput and delay). The QoS requirement for the node is a function of the node use, and a certain QoS threshold is set that allows the node to function according to its associated use. Upon the setting/determination of QoS requirements for the node, an analytical model of the WLAN system is designed 80 that captures the 802.11e MAC layer behavior, and is based on the MAC layer parameters and traffic characteristics. These parameters appear as a system of N equations that can be solved to determine the state of the WLAN at balanced conditions, including values for collision probability, CW backoffs, retransmissions, achieved throughput, and signal delay. It is noted that only one of these N equations are realized individually and available at each node i.e., the entire system model of N equations appears distributed across all the nodes.

Measurements of the WLAN system are made locally at each node 82 and are used as inputs to the analytical model maintained by that node. In an exemplary embodiment, the number of MAC layer acknowledgments and retransmissions are measured and applied to the analytical model 84, thus allowing for implementation of the distributed, gradient descent-based algorithm. Both the MAC layer acknowledgments and the retransmissions are available locally at each node in the 802.11e framework.

Based on the input of the locally measured parameters into the analytical model, the node applies a distributed and adaptive algorithm 86 for adapting its CW size and satisfying its QoS requirements (i.e., throughput and delay). The adaptive algorithm functions to dynamically select the CW size using an analytical gradient descent method. As shown in FIG. 4, a plurality of measurements and MAC parameter updates are made during the gradient descent based optimization. Thus, upon application of the gradient descent algorithm, a determination of an achieved QoS (based on throughput and delay) is made 88 based on a current CW size. A determination is made 90 as to whether the achieved QoS meets the set/determined QoS requirement for the node. More specifically, a determination 90 is made as to whether the achieved throughput comes within a desired percentage of the required throughput needed to meet the QoS threshold. If the achieved throughput does not meet the QoS requirement for the node 92, then the size of the CW is modified 94. The technique then returns back to measuring the number of MAC layer acknowledgments and retransmissions 82, applying these measurements to the analytical model 84 to determine updated throughput, collision rates, and back off rates, and the determining of an achieved QoS 88 based on the modified CW size. That is, a residual method is employed where a series of CW sizes are determined and where a next CW size is computed based on the gradient residuals of the analytical model. Each series of determination/applications performed 82-90 define a "step" 96 in the gradient descent based adaptive algorithm. A series of these steps 96 of measuring/filtering are repeated (along with modifications to CW size 94) until the achieved throughput meets the QoS requirement for the node 98. The rapidity with which the CW size converges to a desired value can be controlled by adjusting a rate at which each of the steps 96 is performed. Thus, for example, if the convergence is desired to occur within one minute, the update time period could be set at a value of 1 Hz. In adjusting the CW size to meet the QoS requirement, the rate of step 96 can be nominally fixed to a desired rate.

When the achieved throughput does meet the QoS requirement for the node 98 (i.e., is within a certain, pre-defined tolerance), then no further modifications to the CW are needed at that time. Thus, upon satisfaction of QoS, a modification is made 100 to the rate at which steps 96 are performed. Upon application of the modification 100, the steps 96 are executed at a second periodic rate that is longer than the first rate (e.g., 0.1 Hz rate). This allows the algorithm described by step 96 to restart periodically and update the parameters (e.g., CW size) in response to changes in the WLAN activity and membership, thus allowing for a "monitoring" of the WLAN activity. The algorithm of step 96 could be restarted at a pre-determined time/rate (i.e., pre-determined modification 100 to step repetition rate). Alternatively, in another embodiment of the invention, the modification 100 could be dependent on the recognition by the node 10 of the presence of other access points and/or other radio nodes in the proximity (by way of NIC 30 and NDIS interface 42). (See FIG. 2) This recognition could be done using existing 802.11 mechanisms for detecting access points and by looking at specific MAC addresses in packets sent to the access point. Upon recognizing a change in the population of nodes in communication with an access point or a new access point, the node would decide that the environment has changed due to other nodes mobility or its own mobility, causing the modification/update 100 to the periodic measurement rate of step 96.

In one application of the invention, it is envisioned that the adaptive CW calculation on a per-node level set forth above can be implemented in hospital networks involving patient monitoring over WLANs. A number of medical devices in such a setting would be required to meet QoS (throughput and delay) thresholds and have these QoS metrics guaranteed, as the wireless traffic from these devices includes critical patient data. For example, and as set forth above, wireless devices such as DASH, CITRIX, and voice-over IP devices would have such QoS requirements. Since the traffic consists of extremely critical patient data, QoS metrics need to be guaranteed in this environment.

Figure 5:
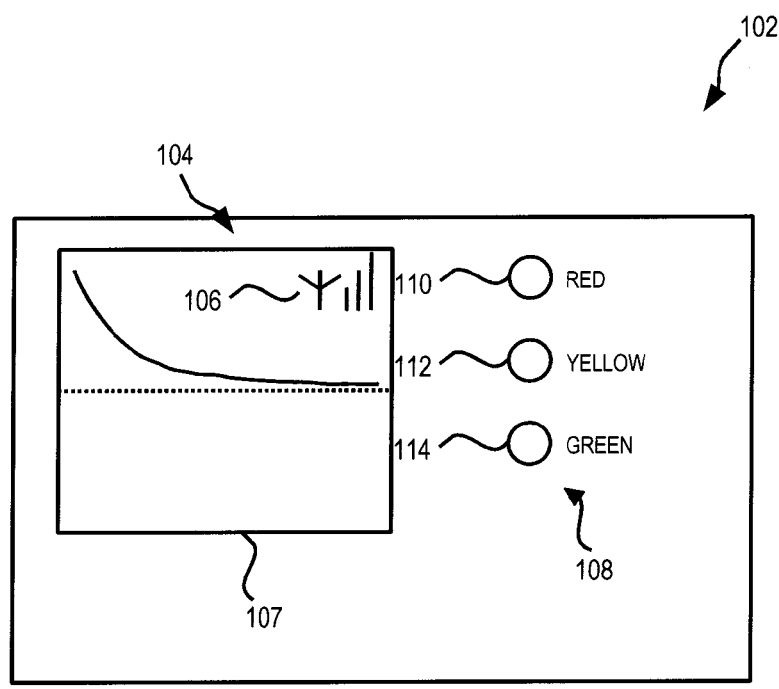
FIG. 5 is a block schematic diagram of a user interface for a node according to an embodiment of the invention.

Referring now to FIG. 5, an exemplary DASH module 102 is shown according to one embodiment. The DASH module 102 follows the general design of the node 10 shown and described with respect to FIG. 2, and thus is understood to include the features associated therewith that allow the module to communicate and connect with a WLAN system, as set forth in detail above. The module 102 further includes thereon a user interface 104 that allows a user to understand the current WLAN environment, the level of QoS which is being achieved by the module, and the convergence state of the adaptive algorithm (i.e., the converging of the CW size). That is, the user interface 104 can include a graph/waveform display 107 that shows collision rate, throughput, and delay data in light of the estimation of the network environment provided by the adaptive algorithm. Additionally, signal strength measurements can also be displayed on an indicator 106 to facilitate the understanding of the wireless environment.

The progress of the QoS algorithm and how close it is to converging to the required throughput and delay can also be displayed on user interface 104 by way of a visual indicator, such as a number of indicator lights 108. In one embodiment, red, yellow, and green indicators 110, 112, 114 are used to display the performance level. The red indicator 110 is activated when a controller (not shown) in module 102 determines that it is not possible to provide the QoS under the current network condition. The yellow indicator 112 is activated when the controller determines that the adaptive algorithm is progressing such that QoS is possible, but that the algorithm has not converged yet such that the QoS is within a desired tolerance. The green indicator 114 is activated when the controller determines that the algorithm has converged and the required QoS has been achieved. Trend identifiers included in the controller would provide such convergence data with respect to the achieved throughput and delay. While described above as incorporating visual indicators, it is also envisioned that DASH module 102 could include an audible indicator that operates at different tones when the achieved throughput meets or fails to meet the module's defined QoS requirement.

A technical contribution for the disclosed method and apparatus is that is provides for a computer implemented technique for dynamically adjusting wireless communications protocol for meeting QoS requirements in a WLAN. The wireless communications protocol needed for meeting the QoS requirements are calculated and adjusted on a per-node level as a distributed type of control for the WLAN.

Therefore, according to one embodiment of the present invention, a wireless local area network (WLAN) includes at least one access point radio and a plurality of nodes in wireless communication with the at least one access point radio according to media access control (MAC) parameters, each of the plurality of nodes having a quality of service (QoS) threshold for wireless communication with the at least one access point radio that is a function of the MAC parameters. Each of the plurality of nodes comprises a controller configured to provide individualized control of the MAC parameters corresponding to the node. The controller is programmed to measure current settings for at least a portion of the MAC parameters for the node, input the current settings for the at least a portion of the MAC parameters of the node into a WLAN system model to generate a system model output, and adapt a setting of at least one of the MAC parameters for the node to meet the QoS threshold for the node based on the system model output.

According to another embodiment of the present invention, a method for selecting a plurality of operating parameters for a node in a wireless local area network (WLAN) includes the steps of deriving a local analytical model of the WLAN based on media access control (MAC) parameters and wireless signal traffic characteristics, acquiring local measurements of a portion of the MAC parameters at the node, and determining an achieved quality of service (QoS) for the node by applying the acquired local measurements of the portion of the MAC parameters to the local analytical model. The method also includes the steps of performing an adaptive optimization of the local analytical model and modifying at least one of the MAC parameters of the node based on the adaptive optimization to meet a QoS threshold for the node.

According to yet another embodiment of the present invention, a controller for a wireless local area network (WLAN) node is programmed to set a quality of service (QoS) requirement for a wireless signal transmission from the WLAN node, the wireless signal transmission being governed by a plurality of media access control (MAC) parameters. The controller is also programmed to generate a model of a WLAN that is based on the plurality of MAC parameters and on signal traffic characteristics of the wireless signal transmission, receive measurements of MAC layer acknowledgements and signal retransmissions from the WLAN node, and insert the received MAC layer acknowledgements and signal retransmissions from the WLAN node into the generated model of the WLAN. The controller is further programmed to perform an adaptive optimization of the generated model upon insertion of the received MAC layer acknowledgements and signal retransmissions to determine a desired value for at least one of the plurality of MAC parameters that satisfies the QoS requirement for the wireless signal transmission by the WLAN node and modify the at least one of the plurality of MAC parameters based on the adaptive optimization to the desired value to satisfy the QoS requirement for the wireless signal transmission by the WLAN node.

The present invention has been described in terms of the preferred embodiment, and it is recognized that equivalents, alternatives, and modifications, aside from those expressly stated, are possible and within the scope of the appending claims.

What is claimed is:

1. A wireless local area network (WLAN) comprising:
at least one access point radio; and
a plurality of nodes in wireless communication with the at least one access point radio according to media access control (MAC) parameters, each of the plurality of nodes having a quality of service (QoS) threshold for wireless communication with the at least one access point radio that is a function of the MAC parameters;
wherein each of the plurality of nodes comprises a controller configured to provide individualized control of the MAC parameters corresponding to a node, the controller programmed to:
measure current settings for at least a portion of the MAC parameters for the node;
determine approximate current settings for at least a portion of the MAC parameters for remaining nodes from the plurality of nodes;
input the current settings for the at least a portion of the MAC parameters of the node and the approximate current settings for the remaining nodes into a WLAN system model to generate a system model output; and
iteratively perform a gradient descent based optimization to adapt a setting of at least one of the MAC parameters for the node till the QoS threshold for the node based on the system model output is met, wherein the QoS threshold comprises at least one of a minimum signal throughput level and a maximum signal time delay.

2. The WLAN of claim 1 wherein the adapting of the setting of the at least one MAC parameter at each iterative step in the plurality of iterative steps is based on gradient residuals of the gradient descent based optimization.

3. The WLAN of claim 1 wherein the controller is further programmed to:
perform each of the plurality of iterative steps at a first repetition rate; and
upon meeting the QoS threshold, performing the plurality of iterative steps at a second repetition rate that is temporally longer than the first repetition rate to monitor WLAN activity.

4. The WLAN of claim 1 wherein the controller is further programmed to determine the second repetition rate based on one of a pre-determined repetition rate and an update to the WLAN.

5. The WLAN of claim 1 wherein the controller is further programmed to adapt the setting of the at least one MAC parameter such that signal throughput is maximized irrespective of a number of the plurality of nodes in the WLAN.

6. The WLAN of claim 1 wherein the at least one adapted MAC parameter comprises a size of a contention window.

7. The WLAN of claim 1 wherein the at least a portion of the MAC parameters comprises a first MAC parameter and a second MAC parameter, the first MAC parameter being a measured number of MAC layer acknowledgments and the second MAC parameter being a measured number of signal retransmissions.

8. The WLAN of claim 1 wherein the plurality of nodes are in wireless communication with the at least one access point radio according to IEEE 802.11e protocol.

9. The WLAN of claim 1 wherein the meeting of the QoS threshold comprises converging the at least one MAC parameter to within a predetermined percentage of the QoS threshold.

10. The WLAN of claim 1 wherein each of the plurality of nodes comprises an indicator configured to alert a user of a convergence trend of the at least one MAC parameter for meeting the QoS threshold.

11. The WLAN of claim 1 wherein the WLAN system model comprises one of a previously computed system model and a stored lookup table.

12. The WLAN of claim 1 wherein the at least one access point radio is programmed to:
determine an amount of residual bandwidth remaining in the WLAN based on the QoS thresholds for each of the plurality of nodes; and
allow admission of an additional node into the WLAN if the amount of residual bandwidth remaining supports admission of the additional node.

13. A method for selecting a plurality of operating parameters for a node in a wireless local area network (WLAN) comprising:
deriving a local analytical model of the WLAN based on media access control (MAC) parameters and wireless signal traffic characteristics;
acquiring local measurements of a portion of the MAC parameters at the node;
determining an achieved quality of service (QoS) for the node by applying the acquired local measurements of the portion of the MAC parameters to the local analytical model; and
performing an adaptive optimization of the local analytical model using gradient based optimization; and
iteratively modifying at least one of the MAC parameters of the node based on the adaptive optimization till a QoS threshold for the node is met, wherein the QoS threshold for the node comprises at least one of a minimum signal throughput level and a maximum signal time delay.

14. The method of claim 13 wherein acquiring local measurements of a portion of the MAC parameters comprises acquiring a number of MAC layer acknowledgments and retransmissions.

15. The method of claim 13 wherein modifying at least one of the MAC parameters of the node to meet the QoS threshold comprises modifying a size of a contention window.

16. The method of claim 13 wherein the local analytical model comprises a model of IEEE 802.11e protocol.

17. A controller for a hospital network node, wherein the controller comprises at least one processor configured to carry out programmable instructions executing the steps to:
set a quality of service (QoS) requirement for a wireless signal transmission from the hospital network node, the wireless signal transmission being governed by a plurality of media access control (MAC) parameters;
generate a model of a hospital network that is based on the plurality of MAC parameters and on signal traffic characteristics of the wireless signal transmission;
receive measurements of MAC layer acknowledgements and signal retransmissions from the hospital network node;
insert the received MAC layer acknowledgements and signal retransmissions from the WLAN node into the generated model of the hospital network;
perform an adaptive optimization of the generated model using gradient-descent optimization upon insertion of the received MAC layer acknowledgements and signal retransmissions to determine a desired value for at least one of the plurality of MAC parameters that satisfies the QoS requirement for the wireless signal transmission by the hospital network node; and modify the at least one of the plurality of MAC parameters based on the adaptive optimization to the desired value till the QoS requirement for the wireless signal transmission by the hospital network node is met, wherein the QoS requirement comprises at least one of a minimum signal throughput level and a maximum signal time delay.

18. The controller of claim 17 further programmed to converge the at least one of the plurality of MAC parameters to the desired value over a plurality of iterative steps performed in the gradient-descent based optimization.

19. The controller of claim 18 wherein the at least one of the plurality of MAC parameters converges to the desired value when the value is within a pre-determined percentage of the desired value.

20. The controller of claim 17 further programmed to determine a contention window size to satisfy the QoS requirement for the wireless signal transmission from the WLAN node.

21. The controller of claim 17 further programmed to activate at least one of a visual alert indicator and an audible alert indicator if the QoS requirement for the WLAN node cannot be met based on a network condition of the WLAN.

\* \* \* \* \*